Jan. 21, 1964 T. HELLRICH 3,118,617
ELECTRICALLY ILLUMINATED ARTIFICIAL CHRISTMAS TREE
Filed March 18, 1960 6 Sheets-Sheet 1

INVENTOR:
Tobias Hellrich
BY
Richards & Geier
ATTORNEYS

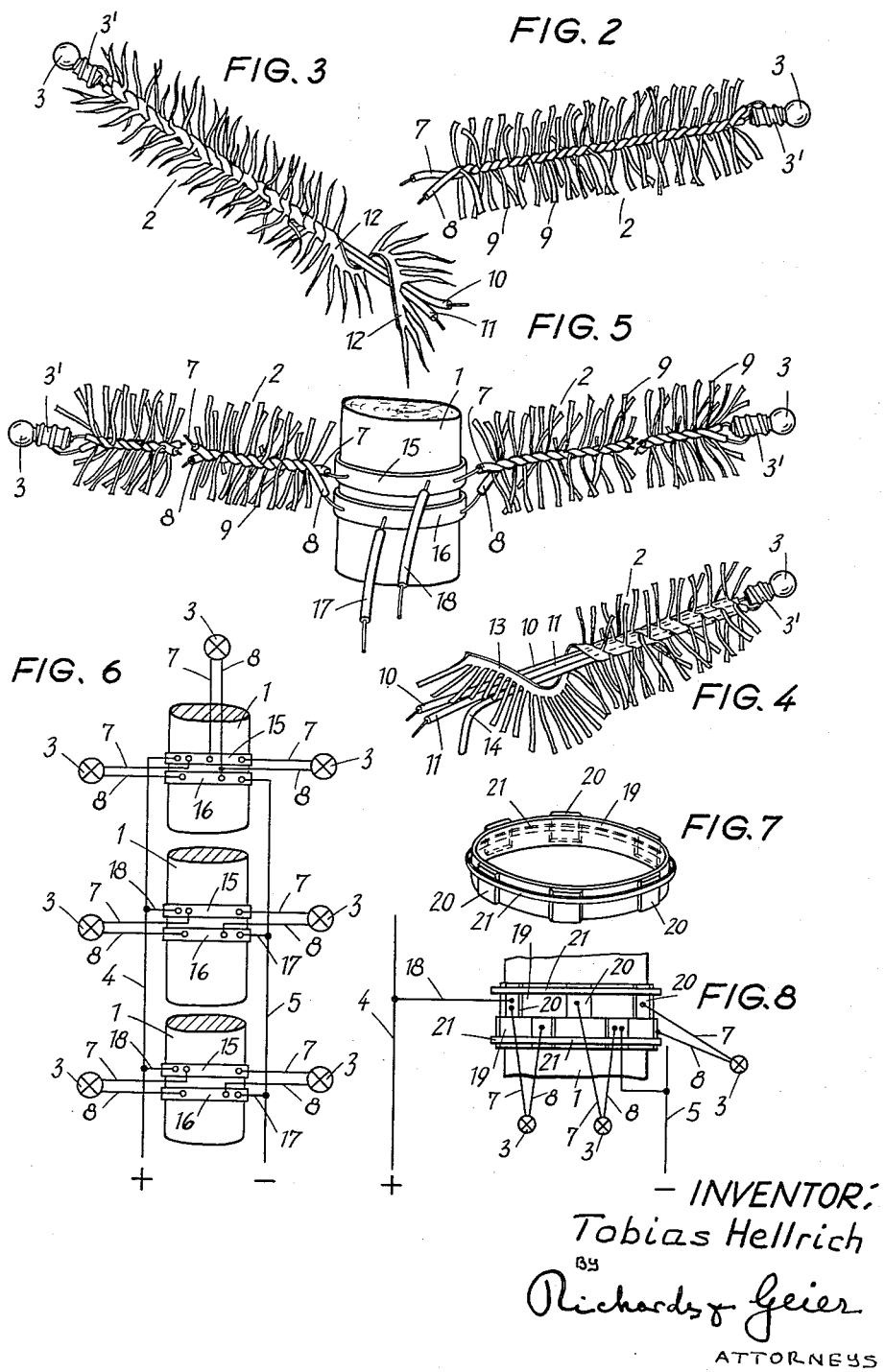

Jan. 21, 1964 T. HELLRICH 3,118,617
ELECTRICALLY ILLUMINATED ARTIFICIAL CHRISTMAS TREE
Filed March 18, 1960 6 Sheets-Sheet 3

INVENTOR:
Tobias Hellrich
BY
Richards & Geier
ATTORNEYS

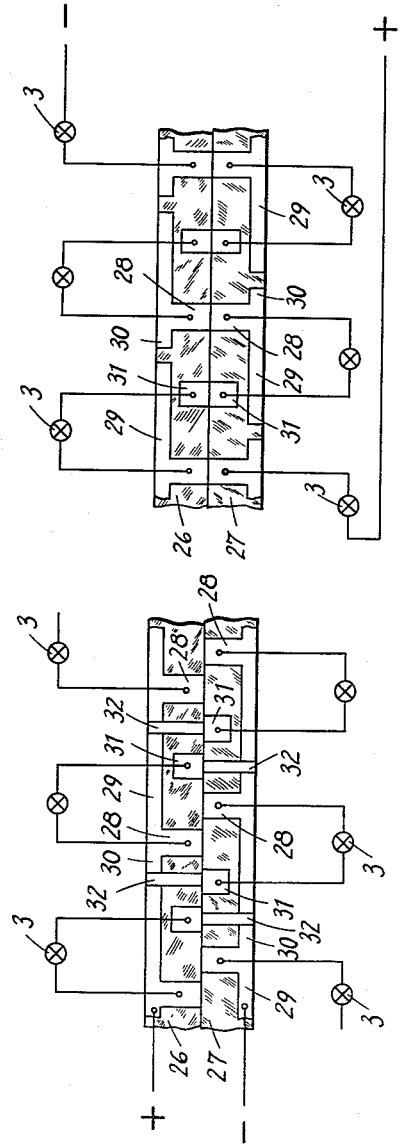

Jan. 21, 1964 T. HELLRICH 3,118,617
ELECTRICALLY ILLUMINATED ARTIFICIAL CHRISTMAS TREE
Filed March 18, 1960 6 Sheets-Sheet 5

INVENTOR:
Tobias Hellrich
BY
Richards & Geier
ATTORNEYS

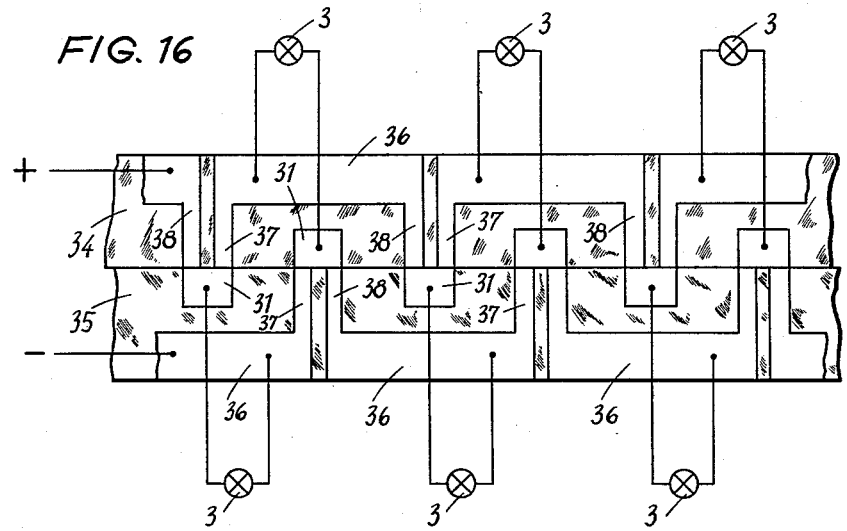
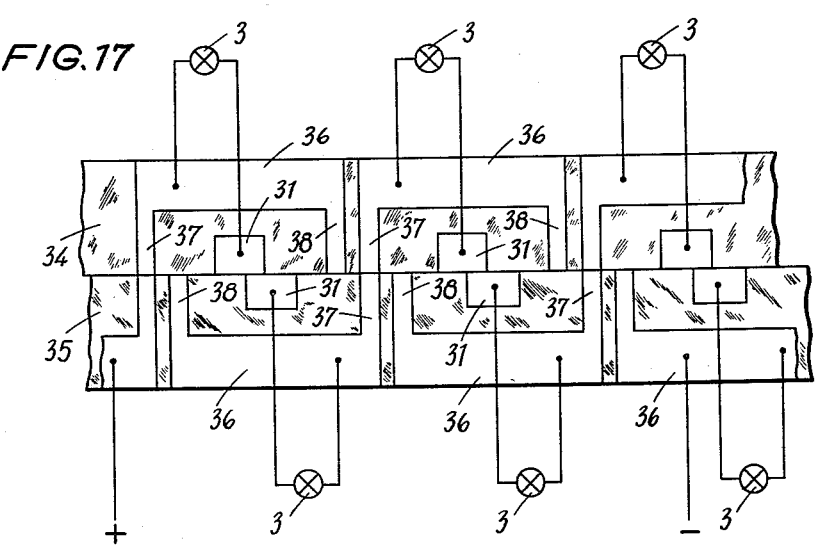

United States Patent Office 3,118,617
Patented Jan. 21, 1964

3,118,617
ELECTRICALLY ILLUMINATED ARTIFICIAL CHRISTMAS TREE
Tobias Heilrich, Birkenstrasse 4, Schwaig, near Nurnberg, Germany
Filed Mar. 18, 1960, Ser. No. 15,985
7 Claims. (Cl. 240—10)

The present invention relates to electrically illuminated artificial Christmas trees and to the manner of producing the same.

It has been known for a long time to make artificial Christmas trees in which the branches to which the needles are secured consist of wires. Also, there have for a long time been electric illuminating sets for Christmas trees in which the lamps are connected either in parallel or in series and which are installed by placing the wires for the lamps on the branches and along the trunk of the tree.

It is an object of the present invention to provide very simple and inexpensive illuminating means for artificial Christmas trees which do not impair the natural appearance of the tree. For accomplishing this object it was found that a mere application of the known illuminating means for natural Christmas trees to artificial Christmas trees cannot be considered because these known means are too expensive and also so voluminous that they would impair the natural appearance of an artificial Christmas tree especially because of the usual small size thereof. According to the present invention, the above-mentioned object is attained and the last-mentioned disadvantages are avoided by utilizing the electric wires for connecting the lamps also for securing the needles to the branches. A very simple embodiment of the invention which does not impair the natural appearance of the artificial Christmas tree may be attained by utilizing the electric wires also to form the branches. For this purpose, each branch may be made of two electric wires, only one of which needs to be insulated. The needles may be placed between the two wires which may then be twisted together to hold the needles in a fixed position.

For producing a branch it is also possible to use a strong wire of a sufficient bending resistance on which the needles may then be secured by means of a thin electric wire. The strong wire may then consist of a material of a higher electric resistance and be of a thickness so that its total electric resistance will be approximately equal to the resistance of the thin wire. One of the two wires, for example, the strong wire, does not need to be insulated.

If in the production of a wire branch, and particularly a long branch, two electric wires twisted together are still not sufficiently stiff, the invention further provides that the branch may then be made more rigid by a supporting wire. This supporting wire may, for example, consist of an iron wire. It is in this manner possible to use thinner electric wires and to save in expensive conductive material. For imitating the needles of a Christmas tree, it is possible to use split bird feathers, or needlelike slitted strips of paper, plastic, or foam rubber foil may be used. A very suitable and well-insulating covering of the electric wires serving two purposes at the same time may be attained by the use of needlelike slitted strips of plastic foil which are wrapped around the electric wires.

In artificial Christmas trees it is conventional to cover the ends of the branches with small balls. According to another feature of the present invention, these balls may be replaced by electric lamp bulbs. Apart from a pleasant appearance, such an arrangement of the lamps at the ends of the branches has the advantage that, when using electric wires of an even thickness, these wires may be made of an equal length which facilitates the mass production of such trees.

For connecting and securing the wire branches, the present invention further provides suitable connecting points on the trunk of the tree. These connections may simply consist of two rings which are connected to the two main conductors and are placed around the trunk and have the electric wires of the branches secured thereto, preferably by soldering.

A very advantageous manner of connecting the electric wires of the branches which may be applied either for a parallel or series connection of the lamps may be attained by providing two superimposed rows of terminals around the trunk and spaced from each other and, if the lamps are to be connected in parallel, by connecting the terminals of each upper and lower row by separate rings to each other. These rings may also serve as supports of the terminals and to secure the terminals to the trunk. In order to insure a perfect insulation of the terminals from each other and relative to the trunk, the invention further provides an insulating sleeve between the terminals or the rings and the tree trunk. Special advantages may be attained if the terminals are rigidly secured to the insulating sleeve. In this case, the terminals may be imbedded in suitable recesses in the insulating sleeve. It is also very advantageous if one insulating sleeve is provided for each of the two rows of terminals of the branches and if the distance between the adjacent terminals of such an insulating sleeve is made greater than the width of the terminals. Such an insulating sleeve will then form a structural unit together with its terminals which may be used for connecting the lamps either in series or in parallel. For either type of connection, two of the mentioned insulating sleeves with the terminals thereon are mounted on the trunk adjacent to the branches and in direct contact with and above each other in the axial direction. If the lamps are to be connected in series, the terminals of both insulating sleeves are then in direct contact with each other, and preferably also in alignment with each other, and if the lamps are connected in parallel, the terminals of one insulating sleeve are connected to each other by a ring or other suitable means.

The provision and the particular design of the insulating sleeves has the advantage that when the lamps are connected in series, the wire branches may be soldered to the terminals of the insulating sleeves before the artificial Christmas tree is assembled and may thereafter be fitted upon the trunk of the tree together with the insulating sleeves, thus forming complete structural units together with the sleeves. The insulating sleeves may be fitted upon the trunk so tightly that they will firmly adhere thereto by friction. By turning the insulating sleeves on the trunk slightly in one direction or the other, it is very easily possible to vary the position of the rows of branches relative to each other and thus to improve the appearance of the entire artificial Christmas tree.

According to a further embodiment of the invention, each second terminal of an insulating sleeve is made of a T-shaped form in which one cross beam of the T is longer than the other and overlaps the adjacent terminal which is not of a T-shaped form. An insulating sleeve which is designed in this manner has the advantage that, regardless of whether the lamps are connected in series or in parallel, the branches may be soldered to the terminals of the individual insulating sleeves prior to the assembly of the entire tree. When these insulating sleeves together with the wire branches are fitted upon the trunk of the artificial tree, one of the two superimposed insulating sleeves of each ring of branches may be turned so that, if the lamps are to be connected in series, their terminals will be in contact with the corresponding terminals on the other insulating sleeve, while if the lamps are to be connected in parallel, the terminals on the two insulating sleeves will not be in contact with each other. Furthermore, in the latter case the cross-beams of the T-shaped terminals of both insulating sleeves will be connected to each other by contact members which are in contact with the terminals of the other insulating sleeve which are not T-shaped.

The assembly of these insulating sleeves may be simplified if the terminals of each pair of superimposed insulating sleeves are staggered relative to each other in such a manner that one T-shaped terminal of one insulating sleeve connects with a terminal of the other insulating sleeve which is not T-shaped. If the lamps are to be connected in parallel, the cross-beams of the T-shaped terminals of one insulating sleeve may then be connected to each other by contact members. This kind of arrangement of two superimposed insulating sleeves not only permits the lamp wires to be soldered in exactly the same manner to the terminals of each insulating sleeve, regardless of whether the lamps are to be connected in series or in parallel, but also permits the contact members which connect the cross-beams of the T-shaped terminals when the lamps are connected in parallel to be made considerably smaller. The contact member may then consist, for example, merely of a drop of solder.

Instead of providing T-shaped terminals on the insulating sleeve, it is also possible according to the invention to apply U-shaped terminals and non-U-shaped terminals between the two arms of each of these U-shaped terminals. Such insulating sleeves have the advantage that, regardless of whether the lamps are to be connected in parallel or in series, the wire branches may be soldered to the terminals of the individual insulating sleeves prior to the assembly of the artificial tree, and also that additional contact members may be omitted.

During the assembly of the artificial Christmas tree, one of two insulating sleeves is turned relative to the other in such a manner that, if the lamps are to be connected in series, the terminals of the two insulating sleeves will not be staggered relative to each other or only to such an extent that the opposite U-shaped terminals will be in contact with each other only with one arm of each U. If the lamps are to be connected in parallel, however, the terminals of the two insulating sleeves will be staggered relative to each other in such a manner that the non-U-shaped terminals of one insulating sleeve will bridge and shorten the adjacent arms of the U-shaped terminals of the other insulating sleeve.

These as well as further objects, features, and advantages of the present invention will become more apparent from the following detailed description thereof, particularly when the same is read with reference to the accompanying drawings, in which:

FIGURE 2 shows a perspective view of an individual wire branch with a lamp connected thereto;

FIGURE 3 shows a modification of a wire branch with a lamp connected thereto;

FIGURE 4 shows a wire branch similar to FIGURE 3 but with a supporting wire;

FIGURE 5 shows a perspective view of a section of the tree according to FIGURE 1 in which the lamps are connected in parallel;

FIGURE 6 shows a wiring diagram of the lamps connected in parallel;

FIGURE 7 shows a perspective view of an insulating sleeve with terminals secured thereto;

FIGURE 8 shows a pair of insulating sleeves according to FIGURE 7 mounted on a tree trunk with the lamps connected in parallel;

FIGURE 12 shows two insulating sleeves above each other and provided with T-shaped terminals and with the lamps being connected in parallel;

FIGURE 13 shows two insulating sleeves with T-shaped terminals similar to those as shown in FIGURE 12, but with the lamps being connected in series;

FIGURE 16 shows two insulating sleeves above each other with U-shaped terminals and with the lamps being connected in parallel; while FIGURES 17 and 18 show the same insulating sleeves as shown in FIGURE 16 but with the lamps being connected in series.

Figure 1:
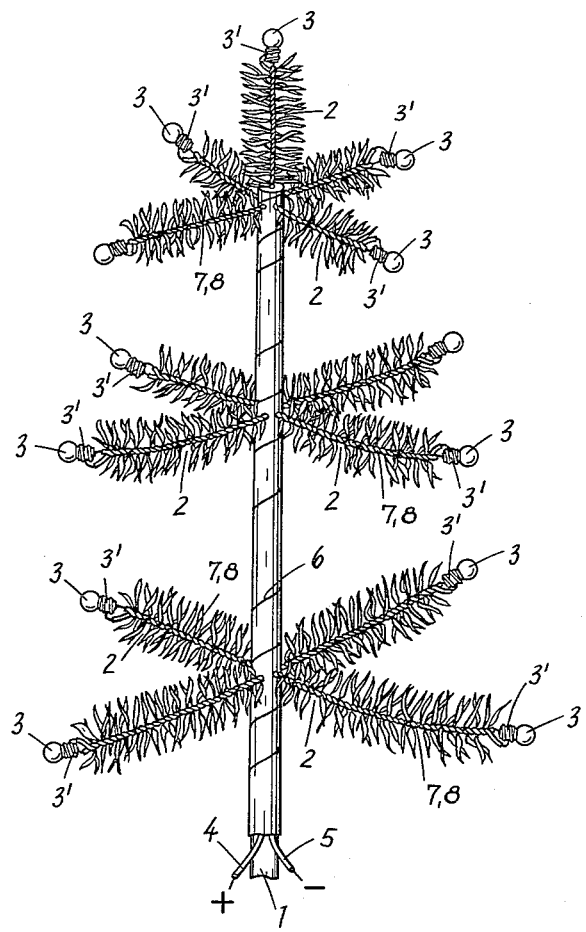
FIGURE 1 shows a perspective side view of an artificial Christmas tree according to the invention.

The artificial Christmas tree as illustrated in FIGURE 1 is principally composed of a trunk 1 which is preferably made of wood to which wire branches 2 are secured which are provided at their ends with lamp bulbs 3 which are screwed into lamp sockets 3'. The main electric wires leading to a source of current are indicated at 4 and 5. The upper part of these wires and the electric connections provided on trunk 1 are covered by an insulating strip 6 which may consist, for example, of paper and be colored in accordance with the color of the trunk of a natural Christmas tree.

The wire branch illustrated in FIGURE 2 consists of two insulated electric wires 7 and 8 which are twisted together so as to hold the interposed needles 9 in a fixed position. These needles may consist of a variety of materials, for example, vegetable fibers, and plastic. The ends of wires 7 and 8 at the right side of FIGURE 2 are connected to a lamp socket 3' into which the lamp bulb 3 is screwed.

The wire branch illustrated in FIGURE 3 consists of two straight wires 10 and 11 which are likewise connected at their outer ends to a lamp socket 3' into which a lamp 3 is screwed. These straight wires 10 and 11 are covered by slitted feathers 12 which are wrapped around the same. In place of slitted feathers it is also possible to use foil strips of paper, foam rubber, or other plastics which are slitted to simulate needles. FIGURE 4 shows an embodiment similar to FIGURE 3 but with an additional supporting wire 14, for example, of iron, to reinforce the branch. All three wires 10, 11, and 14 are covered by a slitted strip 13 of plastic. The downwardly bent end of supporting wire 14 is secured to trunk 1.

As illustrated in FIGURE 5, the electric wires 7 and 8 of branches 2 are soldered to two metal rings 15 and 16 which are mounted on trunk 1 and spaced from each other. Rings 15 and 16 also have additional wires 17 and 18 soldered thereto which connect the rings to the main conductors 4 and 5. The parallel connection of the lamps 3 as shown in FIGURE 5 for one row of branches is illustrated in the wiring diagram according to FIGURE 6 for the entire Christmas tree according to FIGURE 1.

FIGURE 7 shows an annular insulating sleeve 19 which is provided on its outer peripheral surface with terminal members 20 which may be secured thereto in any suitable manner. As indicated in FIGURE 7, these terminals may also be attached to insulating sleeve 19 by means of a clamping ring 21 which, if it is made of electrically conductive material, will then electrically connect the terminals 20 to each other. In place of the metal rings 15 and 16, two of these insulating sleeves 19 may according to FIGURE 8 be mounted above and in contact with each other on trunk 1 and in a position in which the terminals 20 are staggered relative to each other. The electric wires 7 and 8 for lamps 3 may then be connected to adjacent terminals 20 of both insulating sleeves 19.

Figure 9:
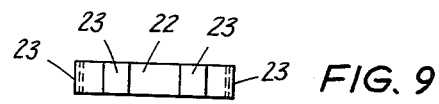
FIGURE 9 shows a side view of an insulating sleeve according to a modification of the invention.
Figure 10:
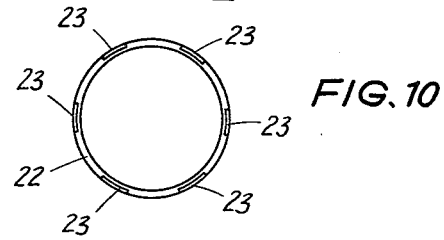
FIGURE 10 shows a plan view of the insulating sleeve according to FIGURE 9.
Figure 11:
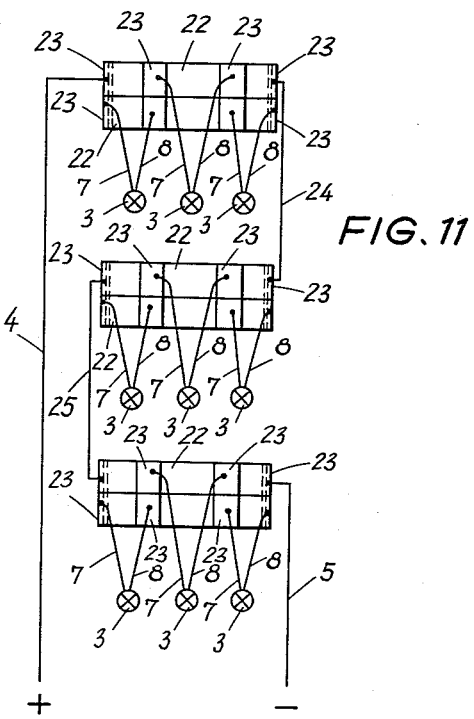
FIGURE 11 shows several pairs of insulating sleeves according to FIGURES 9 and 10 above each other and the lamps connected thereto in series.

The insulating sleeve 22 according to the modification as shown in FIGURES 9 and 10 consists of a suitable insulating material, for example, a plastic, and is provided with peripherally spaced recesses in its outer surface in which terminal members 23 are embedded. This insulating sleeve 22 forms a structural unit which may be easily applied both for connecting the lamps in parallel or in series. A series connection of the lamps by means of terminals 23 on several insulating sleeves 22 is illustrated in FIGURE 11. Each row or ring of branches is mounted on two superimposed insulating sleeves 22, the terminals 23 of which are in contact with each other and in axial alignment with each other along the trunk. Wires 7 and 8 for lamps 3 are soldered to terminals 23 on the insulating sleeves in such a manner that both wires 7 and 8 of each wire branch are connected only to the terminals of a single insulating sleeve, as shown clearly in FIGURE 11. The main conductors 4 and 5 are soldered to the terminals 23 of the uppermost insulating sleeve and of the upper insulating sleeve of the lowest row of branches, respectively. The three pairs of insulating sleeves 22 are connected to each other by wires or other conductors 24 and 25. This arrangement has the advantage that the wire branches may be soldered to the respective terminals of the insulating sleeves before the artificial Christmas tree is assembled. Thus, each row of branches together with its insulating sleeves and terminals may form a separate structural unit which facilitates the storing as well as the assembly of the trees. It is then no longer necessary during the assembly to solder the individual wire branches.

If the lamps are to be connected in parallel, the two insulating sleeves 22 of each row of branches are likewise mounted on trunk 1 above each other in such a manner as shown in FIGURE 8, that the terminals on the two sleeves will be staggered relative to each other so as not to be in electric connection with each other. The terminals of each insulating sleeve 22 are then electrically connected to each other by means of rings 21 or any other suitable connecting means. One terminal of each of the two superimposed insulating sleeves is then electrically connected to one or the other of the main conductors 4 and 5.

FIGURES 12 to 15 illustrate a modification of the insulating sleeves 26 and 27 which are provided with T-shaped terminals 28 in which one arm 29 of the cross beam of the T is longer than the other arm 30. The longer arm 29 extends beyond the terminal 31 which is not T-shaped. If the lamps 3 are connected in parallel as shown in FIGURE 12, arms 29 and 30 of the T-shaped terminals 28 are connected to each other by contact members 32 which extend up to the inner edge of insulating sleeves 26 and 27 so that they will not come into contact with the terminals 31 of the opposite insulating sleeves which are not T-shaped.

FIGURE 13 shows the two insulating sleeves 26 and 27 arranged in such a manner above each other that the terminals 28 and the terminals 31 of both sleeves will be in electric connection with each other so that lamps 3 will be connected in series.

Figure 14:
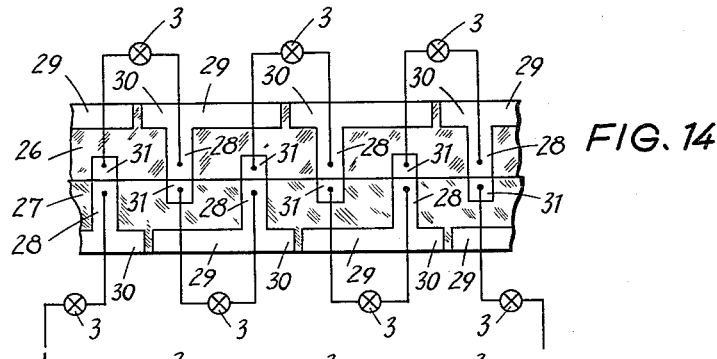
FIGURE 14 shows the same insulating sleeves as shown in FIGURE 13 but in a staggered relation to each other.
Figure 15:
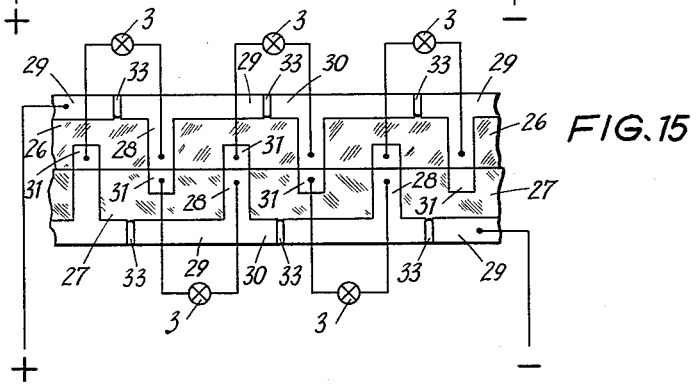
FIGURE 15 shows the same insulating sleeves as shown in FIGURE 14 but with contact members connecting the T-shaped terminals.

FIGURES 14 and 15 show the two associated insulating sleeves 26 and 27 turned relative to each other in such a manner that the T-shaped terminals 28 of one insulating sleeve are in engagement with the terminals 31 of the other insulating sleeve which are not T-shaped. Lamps 3 are then each connected at one side to a T-shaped terminal of one insulating sleeve and at the other side to a non-T-shaped terminal of the same sleeve. The series connection of lamps 3 as illustrated in FIGURE 14 differs from the parallel connection of the lamps as shown in FIGURE 15 merely by the fact that the latter is provided with contact members 33 which conductively connect the T-shaped terminals 28 of each insulating sleeve 26 and 27 with each other at the ends of their arms 29 and 30. Each of these contact members 33 may consist, for example, of a drop of solder, provided that the gap between the long and the short arm of the adjacent T-shaped terminal 28 is made sufficiently narrow. In order to connect the lamps in parallel as shown in FIGURE 15, the terminals 28 may also be made in the form of a continuous strip which, if the lamps are to be connected in series as shown, for example, in FIGURE 14, may be cut apart so that the T-shaped terminals 28 will then be separated from each other.

Figure 18:
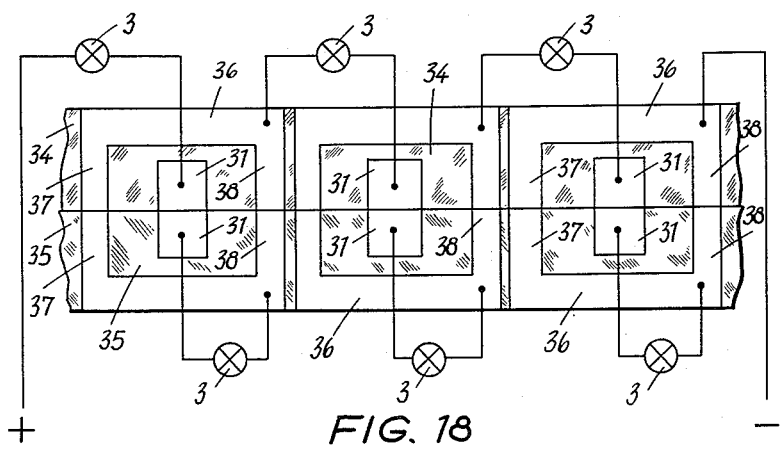

FIGURES 16 to 18 each illustrate a pair of insulating sleeves 34 and 35 which are disposed above each other and have U-shaped terminals 36 secured thereto, each having side arms 37 and 38 between which a terminal 31 is mounted. If the lamps are to be connected in parallel, as shown in FIGURE 16, the two insulating sleeves 34 and 35 are staggered relative to each other so that terminals 31 of one insulating sleeve will interconnect and thus shorten the adjacent arms 37 and 38 of the U-shaped terminals 36 of the opposite insulating sleeve.

If the lamps are to be connected in series, as illustrated in FIGURES 17 and 18, the two insulating sleeves 34 and 35 will either be symmetrically arranged to each other, as shown in FIGURE 18, or be staggered relative to each other in such a manner, as shown in FIGURE 17, that the opposite U-shaped terminals will be in engagement with each other only with one arm 37 thereof.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An electrically illuminated artificial Christmas tree, comprising a trunk, a plurality of tree branches extending in vertically spaced rows, each of said tree branches comprising at least two insulated wires and at least one lamp attached to the outer ends of said insulated wires, a plurality of pairs of insulating sleeves, the sleeves of each pair corresponding to a separate row of tree branches and being mounted one above the other and in engagement with each other upon said trunk, a plurality of laterally spaced terminal members carried by each sleeve, the inner ends of wires of each row of tree branches being attached to terminal members of the pair of sleeve corresponding to that row, the terminal members carried by each sleeve having portions extending to that edge of the sleeve which is in engagement with the edge of the other sleeve of the same pair, the sleeves of each pair being rotatable relatively to each other, whereby in one of their positions the terminal members of the two sleeves are in direct contact with each other to connect the lamps in series and in another one of their positions the terminal members of the two sleeves are staggered and out of contact with each other to connect the lamps in parallel, and means supplying electrical current to said terminal members.

2. An artificial Christmas tree as defined in claim 1, in which each second terminal member on each insulating sleeve is T-shaped and the adjacent terminal member is not T-shaped, one arm of the crossbeam of the T being longer than the other arm and extending beyond the adjacent non-T-shaped terminal member.

3. An artificial Christmas tree as defined in claim 2, further comprising contact members inserted between the adjacent crossbeams of said T-shaped terminal members on each insulating sleeve so as to connect said members with each other and also to engage with the non- T-shaped terminal members on the other insulating sleeve for connecting said lamps in parallel.

4. An artificial Christmas tree as defined in claim 2, in which the terminal members on said pair of insulating sleeves are staggered relative to each other so that each T-shaped member on one insulating sleeve engages with a non-T-shaped member on the other insulating sleeve, and further comprising contact members inserted between the adjacent crossbeams on each insulating sleeve so as to connect said members with each other for connecting said lamps in parallel.

5. An artifical Christmas tree as defined in claim 1, in which said terminal members on each of said insulating sleeves comprise a plurality of U-shaped members laterally spaced from each other, and a separate rectangular member disposed between the arms of and spaced from each of said U-shaped members.

6. An artificial Christmas tree as defined in claim 5, in which, when said sleeves are in the position for connecting said lamps in series, said terminal members on said two insulating sleeves are staggered relative to each other to such an extent that only one side arm of each U-shaped member on one insulating sleeve is in direct engagement with only one side arm of the opposite U-shaped member on the other insulating sleeve.

7. An artificial Christmas tree as defined in claim 5, in which, when said sleeves are in the position for connecting said lamps in parallel, said terminal members on said two insulating sleeves are staggered relative to each other to such an extent that the rectangular members on one insulating sleeve interconnect the adjacent side arms of the adjacent U-shaped members on the other insulating sleeve.

References Cited in the file of this patent
UNITED STATES PATENTS

| | | |
|---|---|---|
| 887,527 | Sargent | May 12, 1908 |
| 1,656,148 | Harris | Jan. 10, 1928 |
| 1,677,972 | Marks | July 24, 1928 |
| 1,707,171 | Moore | Mar. 26, 1929 |
| 1,823,021 | Becker | Sept. 15, 1931 |
| 2,186,351 | Stajaneck | Jan. 9, 1940 |
| 2,465,419 | Barany | Mar. 29, 1949 |
| 2,527,969 | Siebenkittel | Oct. 31, 1950 |
| 2,586,595 | Ashby | Feb. 19, 1952 |
| 2,721,256 | Duhon | Oct. 18, 1955 |
| 2,857,506 | Minteer | Oct. 21, 1958 |
| 2,969,456 | Raymaley | Jan. 24, 1961 |

FOREIGN PATENTS

| | | |
|---|---|---|
| 585,663 | Canada | Oct. 20, 1959 |